April 30, 1929.  A. ROBB  1,711,209
DOORKNOB
Filed Nov. 1, 1927

INVENTOR.
Andrew Robb
BY
ATTORNEYS.

UNITED STATES PATENT OFFICE.

ANDREW ROBB, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DOORKNOB.

Application filed November 1, 1927. Serial No. 230,208.

This invention relates to certain new and useful improvements in knobs, particularly of the hollow wrought metal type, the object being to provide an effective construction whereby the shank and grip portion of the knob will be effectively secured against independent rotation.

In the accompanying drawings—

Figure 1:
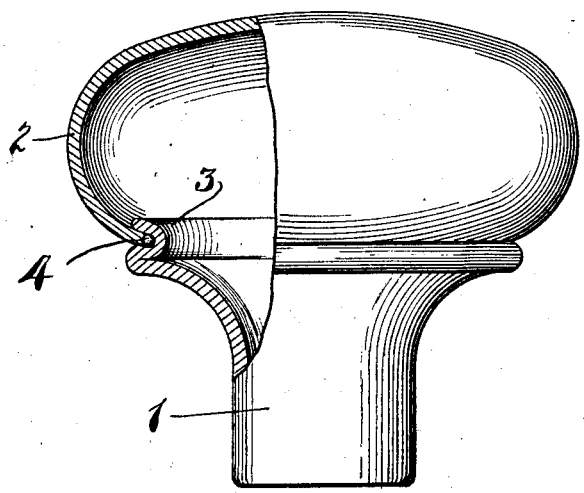
Fig. 1 is a side elevation, partly in section, of my improved knob.
Figure 2:
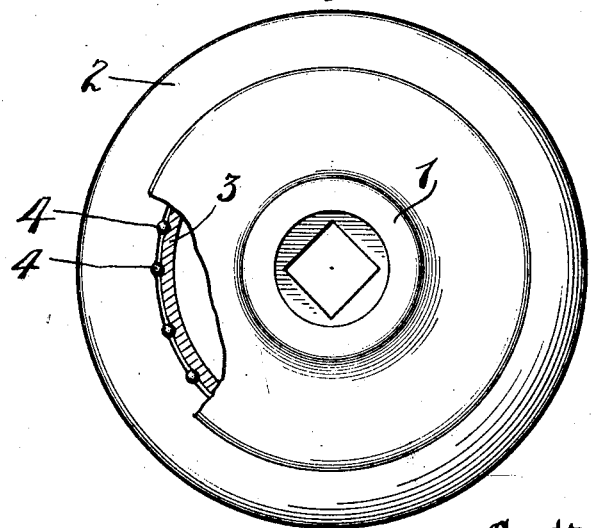
Fig. 2 is a view of the inner end of the knob shown in Fig. 1, also partly in section.

I have shown and shall describe my invention in one preferred form, in which 1 represents the shank portion of a knob, which is designed to receive the usual knob spindle. 2 is a hollow, cup-shaped shell representing the grip portion. That end of the shank portion 1 which is adjacent to the knob is flared outwardly and crimped, as at 3, to provide an annular recess or groove into which the edge of the hollow cup-shaped shell 2 is forced in assembling the knob parts. Thus far described, the knob possesses no novel feature, but in knobs constructed in this manner it has been found that in many cases the grip portion 2 will sometimes turn relatively to the shank portion 1. To prevent this I provide one or more small steel balls 4—4 or the like, locating the same in the groove of the crimp, so that, when the edge of the cupped shell forming the grip portion 2 is forced powerfully into said groove, these small elements 4—4 will imbed into the metal of the shank and the grip portions, forming indentations therein respectively, as indicated in Fig. 2, and thus act as keys to positively and permanently prevent independent turning movement of the shank and grip portions.

I have found that small steel balls of a size that may easily fit into the grooved portion of the shank operate very effectively, inasmuch as they always present rounded surfaces which, during the formation of the knob, force their way into the relatively softer metal of the shank and grip portions, to form the seating notches in the said parts respectively.

What I claim is:

1. In a wrought metal knob, a shank portion having an annular groove therein, a hollow cup-shaped shell forming a grip portion, the edge of said shell projecting into the grooved portion of the shank, and a separate keying element located in an indentation in the bottom of said groove and in an indentation in the adjacent edge of said shell, to prevent said parts from turning one on the other when assembled.

2. In a metal knob, a wrought metal shank portion having an annular groove therein, a hollow cup-shaped wrought metal shell forming a grip portion, the edge of said wrought metal shell projecting into the grooved portion of the shank, and a plurality of separate keying elements of harder metal than the shank or shell located in indentations in the bottom of said groove and in indentations in the adjacent edge of said shell and shank, to prevent said parts from turning one on the other when assembled.

3. In a knob, a shank portion having an annular groove therein, a grip portion comprising a cup-shaped shell of wrought metal, the edge of which extends into said groove, and a steel ball located in said groove between the bottom thereof and the edge of said grip portion, the bottom of said groove and the edge of said grip portion being indented to receive said ball, whereby the latter will operate as a key to prevent the grip portion from turning relatively to the shank.

ANDREW ROBB.